(12) United States Patent
Tamura et al.

(10) Patent No.: US 10,895,306 B2
(45) Date of Patent: Jan. 19, 2021

(54) ECCENTRICALLY OSCILLATING TYPE REDUCTION GEAR

(71) Applicant: SUMITOMO HEAVY INDUSTRIES, LTD., Tokyo (JP)

(72) Inventors: Mitsuhiro Tamura, Kanagawa (JP); Akira Yamamoto, Kanagawa (JP)

(73) Assignee: SUMITOMO HEAVY INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 16/509,602

(22) Filed: Jul. 12, 2019

(65) Prior Publication Data

US 2020/0025277 A1  Jan. 23, 2020

(30) Foreign Application Priority Data

Jul. 23, 2018 (JP) .................. 2018-137994

(51) Int. Cl.
*F16H 1/32* (2006.01)
(52) U.S. Cl.
CPC ......... *F16H 1/32* (2013.01); *F16H 2001/325* (2013.01)
(58) Field of Classification Search
None
See application file for complete search history.

(56) References Cited

U.S. PATENT DOCUMENTS

| | | | |
|---|---|---|---|
| 3,037,400 A * | 6/1962 | Sundt | F16H 1/32 475/180 |
| 5,292,286 A * | 3/1994 | Lan | B62M 9/10 474/116 |
| 5,509,861 A * | 4/1996 | Wacinski | F16H 1/32 475/162 |
| 5,707,310 A * | 1/1998 | Maeguchi | F16H 1/32 475/162 |
| 6,450,913 B1 * | 9/2002 | Strowik | B60N 2/0224 475/178 |
| 9,309,806 B2 * | 4/2016 | Kuroda | F16H 57/021 |
| 2017/0106543 A1 * | 4/2017 | Andoh | F16H 1/32 |
| 2018/0087643 A1 * | 3/2018 | Kunugi | B25J 19/0062 |
| 2019/0390735 A1 | 12/2019 | Tamura et al. | |

FOREIGN PATENT DOCUMENTS

| | | |
|---|---|---|
| DE | 100 08 175 A1 | 12/2000 |
| DE | 11 2015 001 671 T5 | 12/2016 |
| DE | 10 2019 114 097 A1 | 12/2019 |
| JP | 61024854 A * 2/1986 | ............... F16H 1/32 |
| JP | 2017-150609 A | 8/2017 |

OTHER PUBLICATIONS

Office Action issued in German Application No. 10 2019 117 690.5, dated Sep. 23, 2020.

* cited by examiner

Primary Examiner — Timothy Hannon
(74) Attorney, Agent, or Firm — Michael Best & Friedrich LLP

(57) ABSTRACT

An eccentrically oscillating type reduction gear includes an internal gear, an external gear which meshes with the internal gear, and an eccentric body which oscillates the external gear. The external gear is formed of a resin, and the internal gear has an internal gear main body which is formed of a resin, and an outer pin which is rotatably disposed in a pin groove provided in the internal gear main body and is formed of a material having a thermal conductivity higher than that of the resin constituting the internal gear main body.

20 Claims, 3 Drawing Sheets

ECCENTRICALLY OSCILLATING TYPE REDUCTION GEAR

RELATED APPLICATIONS

Priority is claimed to Japanese Patent Application No. 2018-137994, filed Jul. 23, 2018, the entire content of which is incorporated herein by reference.

BACKGROUND

Technical Field

Certain embodiments of the present invention relate to an eccentrically oscillating type reduction gear.

Description of Related Art

In the related art, an eccentrically oscillating type reduction gear is disclosed, which has shock absorbing means constituted by an elastic body in order to provide impact resistance performance in a speed reducer used in a robot.

SUMMARY

According to an aspect of the present invention, there is provided an eccentrically oscillating type reduction gear including: an internal gear; an external gear which meshes with the internal gear; and an eccentric body which oscillates the external gear, in which the external gear is formed of a resin, and the internal gear has an internal gear main body which is formed of a resin, and an outer pin which is rotatably disposed in a pin groove provided in the internal gear main body and is formed of a material having a thermal conductivity higher than that of the resin constituting the internal gear main body.

DETAILED DESCRIPTION

Figure 1:
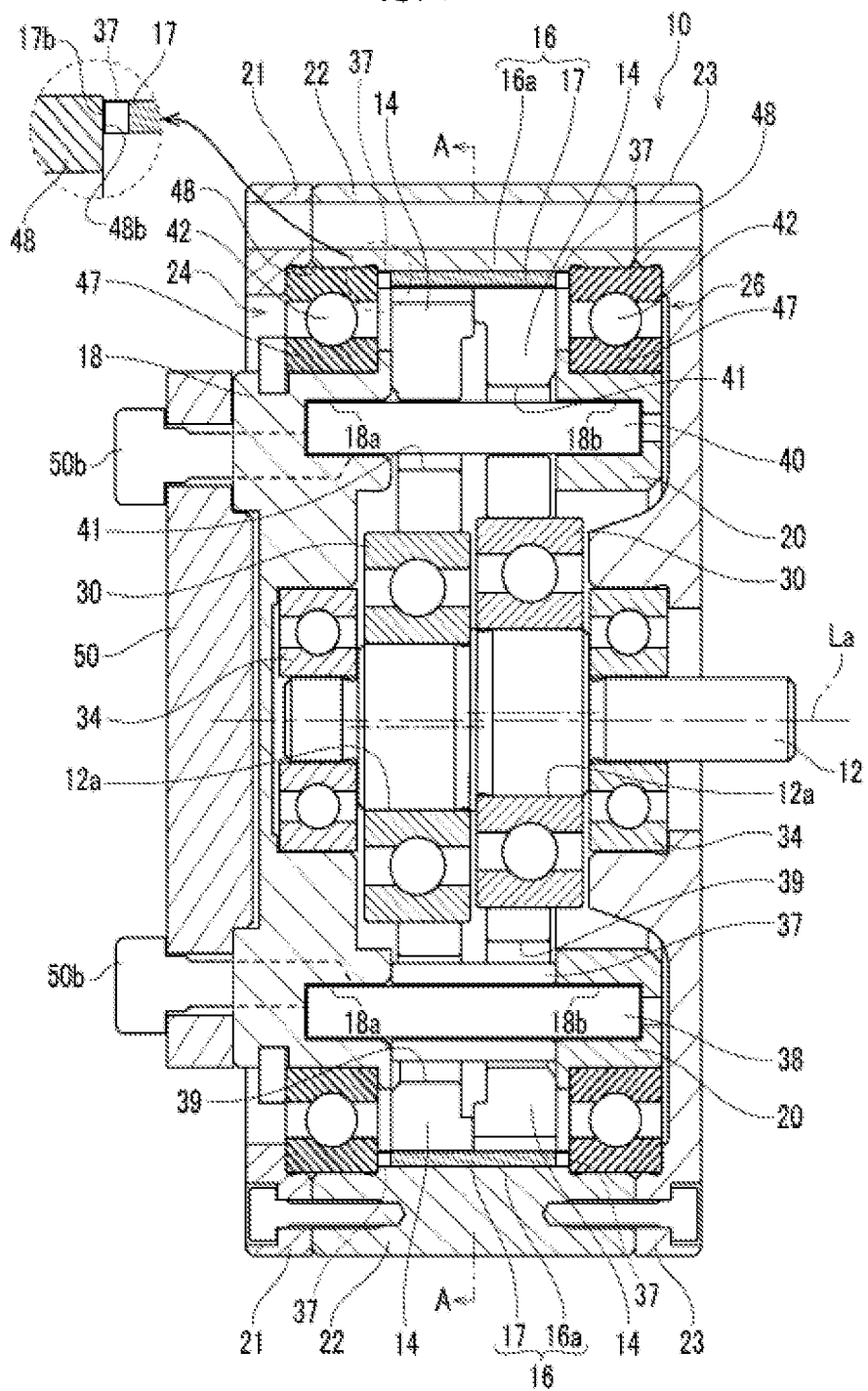
FIG. 1 is a side sectional view showing an eccentrically oscillating type reduction gear of a first embodiment.

In order to reduce weight of a reduction gear, it is considered that a component of the reduction gear is formed of a resin. For example, in a reduction gear described in the related art, an internal gear and an external gear are formed of a resin. However, if a resin member is used in a reduction gear whose internal temperature is high, strength of the resin member is decreased by an increase in the internal temperature, and thus, a life span of a speed reducer may be reduced. As the inventors examined, the present inventors have found that there is room for improvement in the prior art from the viewpoint of suppressing the reduction in the life span of the reduction gear.

It is desirable to provide an eccentrically oscillating type reduction gear capable of suppressing a reduction in a life span of a reduction gear.

In addition, aspects of the present invention include any combination of the above-described constituent elements or mutual substitution of constituent elements or expressions of the present invention among methods, systems, or the like.

According to the present invention, it is possible to provide an eccentrically oscillating type reduction gear capable of suppressing a reduction in a life span.

Hereinafter, the present invention will be described based on preferred embodiments with reference to the drawings. In embodiments, comparative examples, and modification examples, the same or equivalent constituent elements and members are assigned by the same reference numerals, and repeated descriptions will be appropriately omitted. In addition, dimensions of members in each drawing are appropriately enlarged and reduced for ease of understanding. Moreover, in each drawing, a part of members which are not important in describing the embodiment in each drawing will be omitted and displayed. In addition, terms including first and second ordinal numbers are used to describe various constituent elements, but the terms are used only for the purpose of distinguishing one constituent element from other constituent elements, and thus, the constituent elements are not limited by the terms.

First Embodiment

Figure 2:
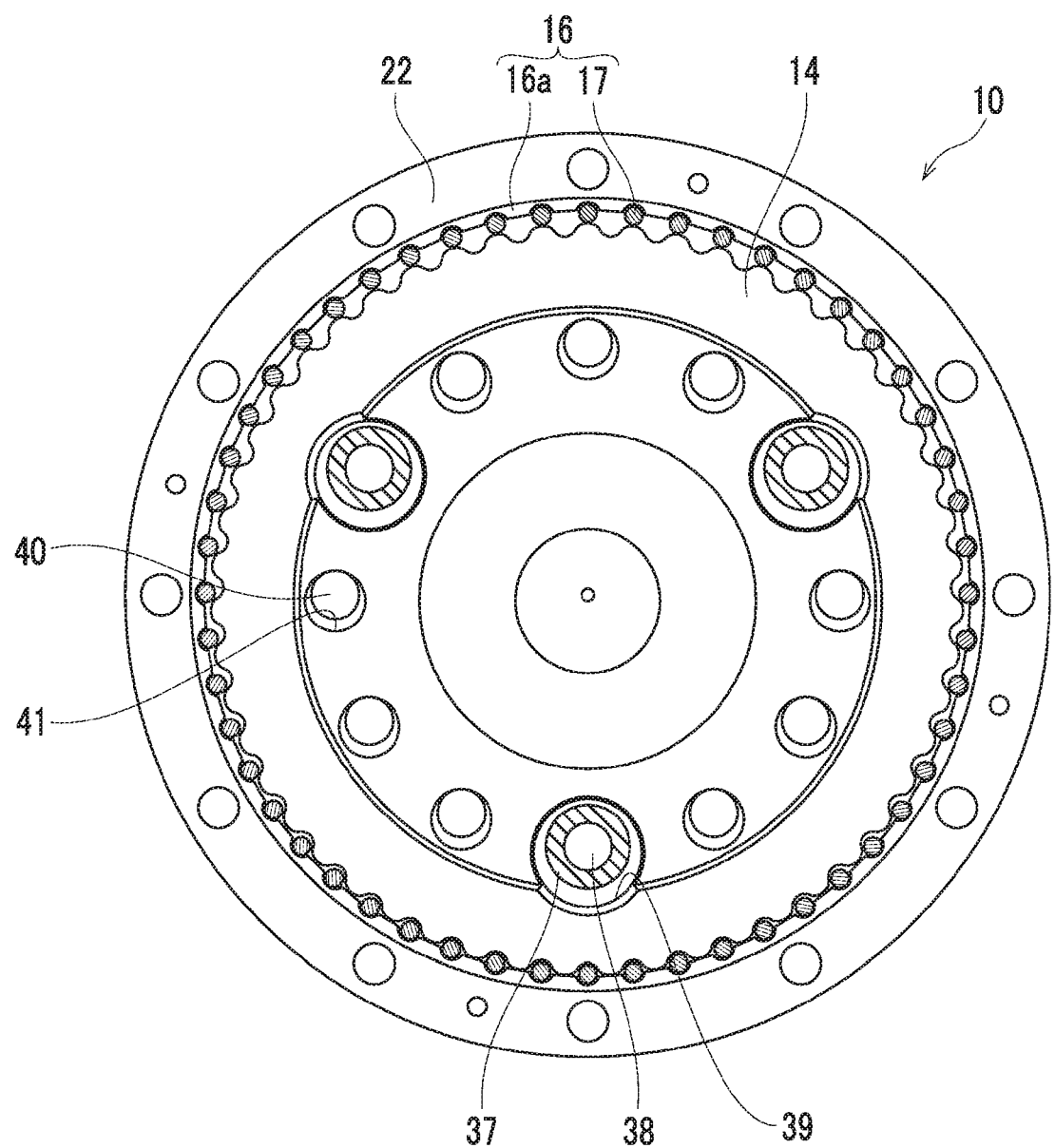
FIG. 2 is a sectional view taken along line A-A of the eccentrically oscillating type reduction gear of FIG. 1.

Hereinafter, a configuration of an eccentrically oscillating type reduction gear 10 according to a first embodiment will be described with reference to FIGS. 1 and 2. FIG. 1 is a side sectional view showing the eccentrically oscillating type reduction gear 10 of the first embodiment. FIG. 2 is a sectional view of the eccentrically oscillating type reduction gear 10 taken along line A-A in FIG. 1. In FIG. 2, one of two external gears 14 is shown and the other is not shown for easy understanding. The other external gear 14 is different from the one external gear 14 in that the other external gear is eccentric with a phase difference of 180°, and the other configurations of the other external gear 14 are the same as those of the one external gear. The eccentrically oscillating type reduction gear 10 of the present embodiment is an eccentrically oscillating type reduction gear in which an external gear meshing with an internal gear is oscillated, and thus, a rotation is generated in one of the internal gear and the external gear, and a generated rotation component is output from an output member to a driven device.

The eccentrically oscillating type reduction gear 10 mainly includes an input shaft 12, the external gears 14, an internal gear 16, carriers 18 and 20, a casing 22, main bearings 24 and 26, an inner pin 40, and a carrier pin 38. Hereinafter, a direction along a center axis La of the internal gear 16 is referred to as an "axial direction", and a circumferential direction and a radial direction of a circle having the center axis La as a center are referred to as a "circumferential direction" and a "radial direction", respectively. In addition, hereinafter, for convenience, one side (right side in FIG. 1) in the axial direction is referred to as an input side, and the other side (left side in FIG. 1) in the axial direction is referred to as a counter input side (load side).

Input Shaft

The input shaft 12 is rotated around a rotation center line by rotational power input from a drive device (not shown). In the present embodiment, the eccentrically oscillating type reduction gear 10 is a center crank type eccentrically oscillating reduction gear in which the rotation center line of the input shaft 12 is provided coaxially with the center axis La of the internal gear 16. For example, the drive device is a motor, a gear motor, an engine, or the like.

In the present embodiment, the input shaft 12 is an eccentric body shaft having a plurality of eccentric portions 12a for oscillating the external gear 14. The input shaft 12 having this configuration may be referred to as a crankshaft.

An axis of each eccentric portion 12a is eccentric with respect to the rotation centerline of the input shaft 12. In the present embodiment, two eccentric portions 12a are provided, and eccentric phases of the adjacent eccentric portions 12a are shifted by 180°.

An input side of the input shaft 12 is supported by a second cover 23 via the input shaft bearing 34, and a counter input side thereof is supported by the first carrier 18 via the input shaft bearing 34. That is, the input shaft 12 is rotatably supported relative to the first carrier 18 and the second cover 23. A configuration of the input shaft bearing 34 is not particularly limited. However, in this example, the input shaft bearing 34 is a ball bearing having ball-shaped rolling elements. The input shaft bearing 34 may be pre-pressurized. However, in this example, the input shaft bearing 34 is not pre-pressurized.

Internal Gear

The internal gear 16 meshes with the external gear 14. In the present embodiment, the internal gear 16 includes an internal gear main body 16a which is integrated with the casing 22, and outer pins 17 which are disposed in a plurality of pin grooves circumferentially spaced apart from the internal gear main body 16a. The outer pin 17 is a cylindrical pin member which is rotatably supported by the internal gear main body 16a. The outer pin 17 constitutes an internal tooth of the internal gear 16. The number of outer pins 17 of the internal gear 16 (the number of internal teeth) is only slightly more (by one in this example) than the number of external teeth of the external gear 14.

The internal gear main body 16a is formed of a resin. Various resins can be used for the internal gear main body 16a. However, in this example, the internal gear main body 16a is formed of POM (polyacetal). The internal gear main body 16a may be formed of a resin such as PEEK (polyetheretherketone) different from POM.

In addition, the resin used for the internal gear main body 16a and other components of the present embodiment may be a resin which contains reinforcing fiber such as glass fiber or carbon fiber, may be a resin which does not contain reinforcing fiber, or may be a resin which is impregnated into a base material such as paper or cloth so as to be laminated. In particular, the resin used for each component of the present embodiment may be a resin which is blended with a thermally conductive filler, and the thermally conductive filler includes ceramic powder such as nano-order filler, aluminum oxide, or aluminum nitride, metal powder such as aluminum, copper, or graphite, or the like.

In the eccentrically oscillating type reduction gear 10, a heating value may be often large in the inside of the eccentrically oscillating type reduction gear 10, particularly around the input shaft 12 rotating at a relatively high speed. Accordingly, if heat dissipation to the outside of the heat generated inside the eccentrically oscillating type reduction gear 10 is low, an increase in the temperature of the reduction gear becomes large. When the temperature increases, strength of a resin member rapidly decreases, and if the resin member is continuously used as it is, the resin member is likely to be damaged. For this reason, in a pair of gears which mesh with each other, when one of the pair of gears is a resin member, preferably, the other of the pair of gears is formed of a material having a thermal conductivity [W/(m·K)] higher than that of the resin member. Therefore, in the eccentrically oscillating type reduction gear 10, the outer pin 17 is formed of a material having a thermal conductivity higher than that of a resin constituting the internal gear main body 16a. In this case, as compared with the case where the thermal conductivity of the outer pin 17 is low, the heat dissipation to the outside of the heat generated inside the eccentrically oscillating type reduction gear 10 is improved.

The material constituting the outer pin 17 may be a material having a thermal conductivity higher than that of the resin constituting the internal gear main body 16a, and may be a metal material, a high thermal conductivity resin, a non-metal material, or the like. Examples of the high thermal conductivity resin include a resin blended with a thermally conductive filler. The outer pin 17 may be a resin which is blended with carbon nanotubes (CNT) and boron nitride nanotubes (BNNT). In the present embodiment, the outer pin 17 is formed of an iron-based metal such as bearing steel.

The outer pin 17 may be a solid member or a hollow member. The outer pin 17 may be a member having a multilayer structure in which a core material is wrapped with a surface material. As one example, in the outer pin 17, one of the core material and the surface material may be formed of an iron-based metal, and the other may be formed of a copper-based metal or an aluminum-based metal. In this case, both mechanical properties and thermal properties can be achieved. Further, as another example, in the outer pin 17, one of the core material and the surface material may be formed of a metal and the other may be formed of a resin. In addition, the outer pin 17 may be formed of a sintered metal.

External Gear

The external gear 14 is individually provided corresponding to each of the plurality of eccentric portions 12a. The external gear 14 is rotatably supported by the corresponding eccentric portion 12a via an eccentric bearing 30. As shown in FIG. 2, in the external gear 14, twelve through-holes are formed at equal intervals at positions offset from the axial center thereof. Among them, the carrier pins 38 are inserted into three holes disposed at equal intervals of 120°, and the inner pins 40 are inserted into the remaining nine holes. Accordingly, the former is referred to as a carrier pin hole 39, and the latter is referred to as an inner pin hole 41. These holes may have the same diameter, but in this example, the diameter of the carrier pin hole 39 is larger than the diameter of the inner pin hole 41.

The external gear 14 is formed of a resin. Various resins can be used for the external gear 14. In particular, since the external gear 14 is disposed in the vicinity of the input shaft 12 where an increase in a temperature is large, the external gear 14 may be formed of a resin having a heat-resistant temperature higher than that of the internal gear main body 16a. From this point of view, the external gear 14 is formed of PEEK. The external gear 14 may be formed of a resin such as POM different from PEEK.

The carrier pin hole 39 and the inner pin hole 41 are circular holes provided at the same radial position. Corrugated teeth are formed on an outer periphery of the external gear 14, the teeth move while coming into contact with the internal gear 16, and thus, the external gear 14 can oscillate in a plane normal to a center axis. The external gear 14 includes the inner pin hole 41 through which the inner pin 40 passes. A gap is provided between the inner pin 40 and the inner pin hole 41 as a play for absorbing an oscillation component of the external gear 14. The inner pin 40 and an inner wall surface of the inner pin hole 41 come in partial contact with each other.

Carrier

The carriers 18 and 20 are disposed on axial side portions of external gear 14. The carriers 18 and 20 include a first carrier 18 which is disposed on the side portion on the counter input side of the external gear 14 and a second carrier 20 which is disposed the side portion on the input side of the external gear 14. The first carrier 18 and the second carrier 20 are rotatably supported by the casing 22 via the first main bearing 24 and the second main bearing 26. Each of the carriers 18 and 20 has a disk shape as a whole. The first carrier 18 rotatably supports the input shaft 12 via the input shaft bearing 34. The second carrier 20 may be configured to support the input shaft via the input shaft bearing. However, in this example, the second carrier 20 does not support the input shaft bearing 34 and the input shaft 12.

The first carrier 18 and the second carrier 20 are connected to each other via the carrier pins 38 and the inner pins 40. The carrier pins 38 and the inner pins 40 axially penetrate the plurality of external gears 14 at positions radially offset from the axis of the external gear 14. In this example, the carrier pins 38 and the inner pins 40 are provided separately from the carriers 18 and 20. However, some of these pins may be integrally formed as a portion of each of the carriers 18 and 20. The carrier pins 38 and the inner pins 40 will be described later.

One of the first carrier 18 and the casing 22 functions as an output member which outputs rotational power to the driven device, and the other functions as a fixed member which is fixed to an external member for supporting the eccentrically oscillating type reduction gear 10. The output member is rotatably supported by the fixed member via the main bearings 24 and 26. In the present embodiment, the output member is the first carrier 18 and the fixed member is the casing 22. A driven member 50 which is rotationally driven by the eccentrically oscillating type reduction gear 10 is connected to an end surface on the counter input side of the first carrier 18 by bolts 50*b*. In the present embodiment, the bolt 50*b* is formed of an iron-based metal.

Casing

The casing 22 has a hollow tubular shape as a whole, and the internal gear 16 is provided on an inner periphery portion thereof. A flange or the like may be provided on an outer peripheral portion of the casing 22. However, in this example, the flange is not provided. The casing 22 includes a first cover 21 which covers the counter input side of the casing 22 and a second cover 23 which covers the input side of the casing 22. The first cover 21 and the second cover 23 are fixed to the casing 22 by a plurality of bolts arranged in the circumferential direction.

The casing 22 includes a recess which receives the input side of an outer ring of the first main bearing 24. The first cover 21 includes a recess which accommodates a portion on the counter input side of the outer ring of the first main bearing 24. The outer ring of the first main bearing 24 is axially interposed between the casing 22 and the first cover 21 and supported by the casing 22 and the first cover 21. The casing 22 includes a recess which accommodates the counter input side of the outer ring of the second main bearing 26. The second cover 23 includes a recess which accommodates a portion on the input side of the outer ring of the second main bearing 26. The outer ring of the second main bearing 26 is axially interposed between the casing 22 and the second cover 23 and is supported by the casing 22 and the second cover 23. The second cover 23 includes a recess which accommodates the outer ring of the input shaft bearing 34 on the input side. That is, the second cover 23 rotatably supports the input side of the input shaft 12 via the input shaft bearing 34.

Main Bearing

The main bearings 24 and 26 include a first main bearing 24 which is disposed between the first carrier 18 and the casing 22 and a second main bearing 26 which is disposed between the second carrier 20 and the casing 22. In the present embodiment, each of the main bearings 24 and 26 includes a plurality of rolling elements 42 and a retainer (not shown). The plurality of rolling elements 42 are provided at intervals in the circumferential direction. In the present embodiment, the rolling element 42 is a spherical body. The retainer holds the relative positions of the plurality of rolling elements 42 and rotatably supports the plurality of rolling elements 42.

In the present embodiment, each of the main bearings 24 and 26 includes an outer ring 48 and an inner ring 47 having a rolling surface of the rolling element 42. The inner ring rolling surface may be provided on outer peripheral surfaces of the carriers 18 and 20 instead of the inner ring. The outer ring 48 is fixed to the casing 22 by a fit such as a clearance fit, an interference fit, or an intermediate fit. A fitting gap may be set corresponding to a difference in coefficients of thermal expansion. A preload may be applied to the main bearings 24 and 26. However, in this example, no preload is applied.

In the present embodiment, the outer ring 48 of each of the main bearings 24 and 26 is formed of a material having a thermal conductivity higher than that of the resin constituting the internal gear main body 16*a*, and the outer ring 48 of each of the main bearings 24 and 26 and the outer pin 17 abut against abut in the axial direction. As shown in FIG. 1, an end portion 48*b* of the outer ring 48 and an end portion 17*b* of the outer pin 17 may be configured to be in direct contact with each other. In addition, the end portion 48*b* and the end portion 17*b* may be configured to be in contact with each other in the axial direction via a spacer of a material having a thermal conductivity higher than that of the resin constituting the internal gear main body 16*a*. According to this configuration, heat transferred to the outer pin 17 is dissipated to the carrier or the like via the outer ring 48, and heat dissipation is improved.

In the present embodiment, the inner rings 47 and the rolling elements 42 of each of the main bearings 24 and 26 are formed of a material having a thermal conductivity higher than that of the resin constituting the internal gear main body 16*a*, and the first carrier 18 is also formed of a material having a thermal conductivity higher than that of the resin constituting the internal gear main body 16*a*. According to this configuration, heat transmitted to the outer ring 48 is dissipated to the first carrier 18 via the rolling elements 42 and the inner ring 47, and the heat transmitted to the first carrier 18 is dissipated to the outside via the driven member 50, and thus, the heat dissipation is improved.

The material constituting the outer ring 48, the inner ring 47 and the rolling elements 42 may be a material having the thermal conductivity higher than that of the resin constituting the internal gear main body 16*a*, and may be a metal material, a resin having a high thermal conductivity, or a nonmetal material. In this embodiment, the outer ring 48, the inner ring 47 and the rolling elements 42 are formed of an iron-based metal such as bearing steel.

The material constituting the first carrier 18 may be a material having a thermal conductivity higher than that of the resin constituting the internal gear main body 16*a*, and may be a metal material, a resin having a high thermal conductivity, or a non-metal material. From the viewpoint of achieving both weight reduction and mechanical strength, the first carrier 18 may be made of a light metal (a metal having a specific gravity of 4 to 5 or less) such as aluminum, magnesium, beryllium, or titanium, or a composite material of these. In the present embodiment, the first carrier 18 is formed of an aluminum-based metal. In this case, the first carrier 18 can be formed f a metal material having a specific gravity smaller than that of the input shaft 12.

The second carrier 20 can be formed of a metal or various resins. In the present embodiment, the second carrier 20 is formed of POM. In this case, weight of the second carrier 20 can be reduced. In order to reduce heat conduction from the input shaft bearing 34, the second carrier 20 does not come into direct contact with the input shaft bearing 34 but is disposed via a space. The second carrier 20 may also be formed of a material having a thermal conductivity higher than that of the resin constituting the internal gear main body 16a. In this case, the heat dissipation is further improved.

Inner Pin

As shown in FIG. 1, the inner pin 40 is inserted into the inner pin hole 41, which is formed to penetrate the external gear 14, with a gap. One end of the inner pin 40 is fitted into the recess 18b of the first carrier 18, and the other end is fitted into the recess 20b of the second carrier 20. The inner pin 40 is press-fitted to the recess 18b and 20b and is not fixed by a bolt or the like. The inner pin 40 is in contact with a portion of the inner pin hole 41 formed in the external gear 14, and restricts the rotation of the external gear 14 and allows only oscillation of the external gear 14. The inner pin 40 functions as a connection member which contributes to transmission of power between the first carrier 18 and the second carrier 20 and the external gear 14.

Carrier Pin

The carrier pin 38 is inserted into the carrier pin hole 39, which is formed to penetrate the external gear 14, with a gap. One end of the carrier pin 38 is fitted into the recess 18c of the first carrier 18, and the other end is fitted into the recess 20c of the second carrier 20. The carrier pin 38 is press-fitted to the recess 18c and 20c and is not fixed by a bolt or the like. The carrier pin 38 is surrounded by a tubular spacer 37. One end of the spacer 37 abuts against the first carrier 18 and the other end abuts against the second carrier 20. The spacer 37 functions as a spacer for keeping an axial distance between the first carrier 18 and the second carrier 20 at an appropriate distance. The carrier pins 38 and the spacer 37 are not in contact with the carrier pin holes 39 of the external gear 14 and do not contribute to the restraint of the rotation of the external gear 14. The carrier pin 38 functions as a connection member which contributes only to a connection between the first carrier 18 and the second carrier 20.

Next, a material which constitutes each component of the present embodiment will be described. In recent years, application of a reduction gear to a cooperative robot or the like which is operated near a people expands. In order to expand the application, weight reduction and noise reduction of the reduction gear are desired. A reduction gear in the related art is configured of components formed of an iron-based metal, and in order to reduce the weight, it is considered that the components are formed of a material having low specific gravity. As this material, a resin or the like is suitable. Meanwhile, if the component is formed of a resin, it is considered that a decrease in heat dissipation causes an increase in the temperature and a life span is shortened. For this reason, preferably, the material constituting each component is selected in consideration of the weight reduction and the heat dissipation.

A high-speed rotation before deceleration is input to the input shaft 12 and the input shaft bearing 34 which is disposed between the first carrier 18 and the input shaft 12. For this reason, increases in the temperatures of the input shaft 12 and the input shaft bearing 34 are relatively large, and if heat resistances thereof are low, an allowable input rotational speed is low. Therefore, the input shaft bearing 34, the input shaft 12, and the eccentric bearing 30 may be formed of a metal such as an iron-based metal. In this case, it is possible to suppress a decrease in the allowable input rotational speed. In addition, a large torsional stress is applied to the input shaft 12, and thus, preferably, the input shaft 12 be formed of a material having a rigidity higher than that of the first carrier 18. The input shaft 12 is formed of an iron-based metal, which has the torsional strength higher than that of aluminum.

As the iron-based metal used for each component of the present embodiment, carbon steel, bearing steel, stainless steel, or the like can be used according to the desired characteristics.

In order to secure connection strength between the first carrier 18 and the second carrier 20, it is desirable that a rigidity of the carrier pin 38 is high. From this point of view, the carrier pin 38 may be formed of metal, and the spacer 37 may be formed of a resin for weight reduction. In this example, the carrier pin 38 is formed of an iron-based metal, and the spacer 37 is formed of POM.

In the present embodiment, the casing 22 is integrated with the internal gear main body 16a and may be formed of the same material as that of the internal gear main body 16a.

From the viewpoint of the weight reduction, the first cover 21 and the second cover 23 may be formed of a resin. The first cover 21 and the second cover 23 may be formed of the same resin as each other or may be formed of a resin different from each other. In the present embodiment, the first cover 21 and the second cover 23 are formed of POM.

An operation of the eccentrically oscillating type reduction gear 10 having the above-described configuration will be described. If the rotation power is transmitted from the drive device to the input shaft 12, the eccentric portions 12a of the input shaft 12 rotate around the rotation center line passing through the input shaft 12, and the external gears 14 are oscillated by the eccentric portions 12a. In this case, each external gear 14 oscillates such that an axis of the external gear 14 rotates around the rotation center line of the input shaft 12. If the external gears 14 oscillate, meshing positions between the external gears 14 and the outer pins 17 of the internal gear 16 are sequentially shifted. As a result, each time the input shaft 12 rotates once, a rotation of one of the external gear 28 and the internal gear 16 is generated by a difference between the number of the teeth of the external gear 14 and the number of the outer pins 17 of the internal gear 16. In the present embodiment, the external gear 14 rotates, and a decelerated rotation is output from the first carrier 18.

In the eccentrically oscillating type reduction gear 10 of the present embodiment, the internal gear main body 16a or the external gear 14 is formed of a resin to achieve the weight reduction. In addition, the internal gear 16 has the internal gear main body 16a which is formed of a resin, and the outer pin 17 which is rotatably disposed in the pin grooves provided in the internal gear main body 16a and is formed of a material having a thermal conductivity higher than that of the resin constituting the internal gear main body 16a. In this case, compared with the case where the outer pin 17 is formed of a material having a relatively low thermal conductivity, the thermal conductivity between the external gear 14 and the internal gear 16 is improved and the heat generated internally can be effectively dissipated improved via the outer pin 17. In particular, the heat of the external gear 14 formed of a resin can be dissipated efficiently, and thus, a possibility of breakage of the external gear 14 due to strength reduction at a high temperatures can be reduced. In addition, an excessive increase in the internal temperature can be suppressed, and thus, a possibility of deformation or breakage due to increases in the temperatures in other resin members can be reduced.

In addition, in the eccentrically oscillating type reduction gear 10 of the present embodiment, the outer ring 48 of the main bearing 24 is formed of the material having the thermal conductivity higher than that of the resin constituting the internal gear main body 16a, and the outer ring 48 of the main bearing 24 and the outer pin 17 abut against each other in the axial direction or abut against each other through the spacer of the material having the thermal conductivity higher than that of the resin constituting the internal gear main body 16a. In this case, compared to a case where the outer pin 17 does not abut against the outer ring 48, the thermal resistance between the outer pin 17 and the outer ring 48 decreases, and the internal heat can be dissipated more efficiently via the outer pin 17 and the outer ring 48. As a result, the increase in the internal temperature can be further suppressed. The same effect can be achieved by using the spacer formed of a material having a relatively high thermal conductivity.

In addition, in the eccentrically oscillating type reduction gear 10 of the present embodiment, the rolling element 42 and the inner ring 47 of the main bearing 24 are formed of the material having the thermal conductivity higher than that of the resin constituting the internal gear main body 16a, and the carrier 18 is also formed of the material having the thermal conductivity higher than that of the resin constituting the internal gear main body 16a. In this case, compared to a case where the rolling element 42, the inner ring 47, and the carrier 18 are formed of a material having a relatively low thermal conductivity, the internal heat can be dissipated more efficiently via the rolling element 42, the inner ring 47, and the carrier 18. Particularly, in a case where the carrier 18 is in contact with the driven member 50, the heat dissipation from the carrier 18 is further improved. As a result, the increase in internal temperature can be further suppressed.

Second Embodiment

Figure 3:
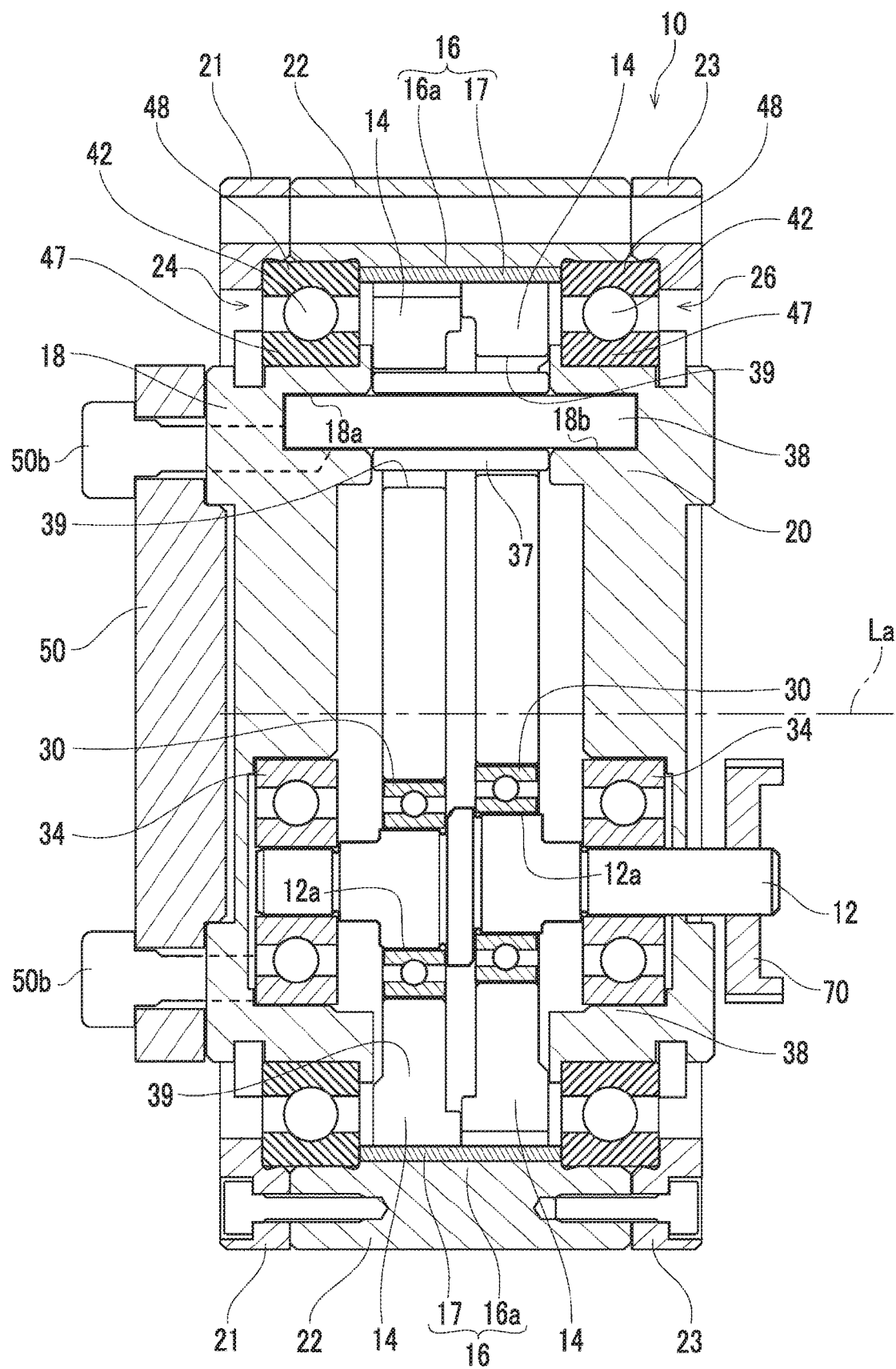
FIG. 3 is a side sectional view showing an eccentrically oscillating type reduction gear of a second embodiment.

Next, a configuration of an eccentrically oscillating type reduction gear 10 of a second embodiment will be described. In drawings and descriptions of the second embodiment, the same reference numerals are assigned to the same or equivalent constituent elements and members as those of the first embodiment. Descriptions overlapping with those of the first embodiment are appropriately omitted, and configurations different from those of the first embodiment are mainly described. FIG. 3 is a side sectional view showing the eccentrically oscillating type reduction gear 10 of the second embodiment and corresponds to FIG. 1.

In the descriptions of the first embodiment, the center crank type eccentrically oscillating reduction gear is described as an example. However, the eccentrically oscillating type reduction gear of the present embodiment is a so-called distribution type eccentrically oscillating reduction gear. The eccentrically oscillating type reduction gear 10 of the present embodiment is mainly different from the first embodiment in that the eccentrically oscillating type reduction gear 10 of the present embodiment has a plurality of input gears 70 and the configuration of the input shaft 12 is different.

The plurality of input gears 70 are disposed around the center axis La of the internal gear 16. In FIG. 3, only one input gear 70 is shown. The input gear 70 is supported by an input shaft 12 which is inserted into a center thereof, and is rotatably provided integrally with the input shaft 12. The input gear 70 meshes with external teeth of a rotation shaft (not shown) which is provided on the center axis La of the internal gear 16. The rotational power is transmitted to the rotation shaft from a drive device (not shown), and the input gear 70 is rotated integrally with the input shaft 12 by a rotation of the rotation shaft.

In the present embodiment, a plurality of (for example, three) input shafts 12 are circumferentially disposed at intervals at positions offset from the center axis La of the internal gear 16. In FIG. 3, only one input shaft 12 is shown.

An operation of the eccentrically oscillating type reduction gear 10 of the above-described present embodiment will be described. If rotational power is transmitted from the drive device to the rotation shaft, the rotational power is distributed from the rotation shaft to the plurality of input gears 70, and the input gears 70 rotate at the same phase. If each input gear 70 rotates, the eccentric portion 12a of the input shaft 12 rotates around the rotation center line passing through the input shaft 12, and the external gear 14 is oscillated by the eccentric portion 12a. If the external gear 14 oscillates, similarly to the first embodiment, the meshing position between the external gear 14 and the outer pin 17 of the internal gear 16 is sequentially shifted, and thus, a rotation of one of the external gear 14 and the internal gear 16 is generated. The rotation of the input shaft 12 is decelerated by a deceleration ratio corresponding to the difference between the number of teeth of the external gear 14 and the number of the outer pins 17 of the internal gear 16, and the decelerated rotation is output from the output member to the driven device. In the present embodiment, the output member is the first carrier 18.

In the present embodiment, the outer pin 17, the outer ring 48 of each of the main bearings 24 and 26, the rolling element 42, the inner ring 27, and the first carrier 18 are formed of a material having a thermal conductivity higher than that of the resin constituting the internal gear main body 16a. Particularly, the internal gear main body 16a, the external gear 14, the second carrier 20, the casing 22, the first cover 21, the second cover 23, and the spacer 37 are formed of a resin. In addition, the outer pin 17, the main bearings 24 and 26, the eccentric bearings 30, the input shaft bearing 34, the carrier pin 38, the input shaft 12, and the bolt 50b are formed of an iron-based metal. Moreover, the first carrier 18 is formed of a light metal such as aluminum. In the present embodiment, some or all of these components may be formed of another material. In particular, the second carrier 20 may be formed of a light metal such as aluminum or PEEK. In the second embodiment having the above-described configuration, the same operation and effect as those of the first embodiment can be obtained.

Hereinbefore, the examples of the embodiments of the present invention are described. The above-described embodiments are merely specific examples for implementing the present invention. The contents of the embodiments do not limit the technical scope of the present invention, and many design changes such as modifications, additions, and deletions of constituent elements can be made within a scope which does not depart from the concept of the invention defined by the claims. In the above-mentioned embodiments, although the description of "of the embodiment", "in the embodiment" or the like is given with respect to the contents which can be changed in design as described above, the design changes can be applied to contents without the notation. Moreover, hatching attached to the cross section of the drawing does not limit a material of a hatched object.

Hereinafter, a modification example will be described. In descriptions and drawings of the modification example, the same reference numerals are assigned to the same or equivalent constituent elements and members as those of the embodiments. Descriptions overlapping with those of the embodiments are appropriately omitted, and configurations different from those of the first embodiment are mainly described.

Modification Example

In the descriptions of the embodiments, the example is described in which the second carrier 20, the casing 22, the first cover 21, the second cover 23, and the spacer 37 are formed of a resin. However, some or all thereof may be formed of a material different from the resin.

In the descriptions of the embodiments, the example is described, in which the outer pin 17, the main bearings 24 and 26, the eccentric bearing 30, the input shaft bearing 34, the carrier pin 38, the inner pin 40, the input shaft 12, and the bolt 50b are formed of an iron-based metal. However, some or all thereof may be a material different from the iron-based metal.

In the descriptions of the embodiments, the example in which the first carrier 18 is formed of a light metal such as aluminum is described. However, the first carrier 18 may be formed of a material different from the light metal.

In the descriptions of the embodiments, the example in which two external gears 14 are provided is described. However, the present invention is not limited to this. Three or more external gears 14 may be provided. For example, in the input shaft, three eccentric portions 12a having phases shifted by 120° may be provided, and three external gears 14 which are oscillated by the three eccentric portions 12a may be provided. Moreover, one external gear 14 may be provided.

In the descriptions of the embodiments, the example in which each of the second main bearing 26 and the first main bearing 24 has the inner ring is described. However, the present invention is not limited to this. At least one of the second main bearing 26 and the first main bearing 24 may be a bearing which does not have the inner ring.

In the descriptions of the embodiments, the example in which each bearing is a ball bearing having ball-shaped rolling elements is described. However, the present invention is not limited to this. Some or all of the bearings may be a roller bearing which has cylindrical rolling elements.

In the descriptions of the embodiments, the example in which the output member is the carrier 18 and the fixed member is the casing 22 is described. However, the present invention is not limited to this. The fixed member may be the carrier 18 and the output member may be the casing 22.

In the descriptions of the embodiments, the example in which the first carrier 18 and the second carrier 20 are provided is described. However, the present invention is not limited to this. Only the first carrier may be provided on one side of the external gear the axial direction.

The above-described modification examples have the same operation and effect as those of the above-described embodiments.

Any combination of the above-described embodiments and modification examples is used as the embodiment of the present invention. A new embodiment generated by the combinations has effects of the embodiment and the modification example to be combined.

It should be understood that the invention is not limited to the above-described embodiment, but may be modified into various forms on the basis of the spirit of the invention. Additionally, the modifications are included in the scope of the invention.

What is claimed is:

1. An eccentrically oscillating type reduction gear comprising:
    an internal gear;
    an external gear which meshes with the internal gear; and
    an eccentric body which oscillates the external gear,
    wherein the external gear is formed of a resin, and
    wherein the internal gear comprises:
        an internal gear main body which is formed of a resin, and
        an outer pin which is rotatably disposed in a pin groove provided in the internal gear main body and is formed of a material having a thermal conductivity higher than that of a material constituting the internal gear main body.

2. The eccentrically oscillating type reduction gear according to claim 1, further comprising:
    a casing which integrally rotates with the internal gear;
    a carrier which rotates relative to the casing; and
    a main bearing which is disposed between the casing and the carrier,
    wherein an outer ring of the main bearing is formed of a material having a thermal conductivity higher than that of the material constituting the internal gear main body, and
    wherein the outer ring of the main bearing and the outer pin abut against each other in an axial direction or abut against each other via a spacer formed of a material having a thermal conductivity higher than that of the resin constituting the internal gear main body.

3. The eccentrically oscillating type reduction gear according to claim 2,
    wherein a rolling element and an inner ring of the main bearing are formed of a material having a thermal conductivity higher than that of the material constituting the internal gear main body and the carrier is formed of a material having a thermal conductivity higher than that of the material constituting the internal gear main body.

4. The eccentrically oscillating type reduction gear according to claim 1, wherein the internal gear main body is formed of the resin containing a reinforcing fiber.

5. The eccentrically oscillating type reduction gear according to claim 4, wherein the internal gear main body is formed of a PEEK (polyetheretherketone) containing the reinforcing fiber.

6. The eccentrically oscillating type reduction gear according to claim 1, wherein the outer pin is formed of a metal material.

7. The eccentrically oscillating type reduction gear according to claim 6, wherein the outer pin is formed of an iron-based metal.

8. The eccentrically oscillating type reduction gear according to claim 1, wherein the outer pin has a multilayer structure in which a core material is wrapped with a surface material.

9. The eccentrically oscillating type reduction gear according to claim 1, wherein the external gear is formed of the resin containing a reinforcing fiber.

10. The eccentrically oscillating type reduction gear according to claim 9, wherein the external gear is formed of a PEEK (polyetheretherketone) containing the reinforcing fiber.

11. The eccentrically oscillating type reduction gear according to claim 1, wherein the external gear is formed of the resin having a heat-resistant temperature higher than that of the internal gear main body.

12. The eccentrically oscillating type reduction gear according to claim 1, further comprising:
a casing which integrally rotates with the internal gear;
a carrier which rotates relative to the casing; and
a main bearing which is disposed between the casing and the carrier,
wherein the carrier and the main bearing are formed of a material having a thermal conductivity higher than that of the material constituting the internal gear main body, and
wherein the carrier is formed of a light metal.

13. The eccentrically oscillating type reduction gear according to claim 12, wherein the carrier is formed of an aluminum-based metal.

14. The eccentrically oscillating type reduction gear according to claim 12, further comprising:
an input shaft on which the eccentric body is provided,
wherein the carrier is formed of a metal material having a specific gravity smaller than that of the input shaft.

15. The eccentrically oscillating type reduction gear according to claim 12, further comprising:
an inner pin which is inserted into an inner pin hole provided in the external gear and contributes to transmission of power between the carriers,
wherein the inner pin is formed of an iron-based metal.

16. The eccentrically oscillating type reduction gear according to claim 12,
wherein the carrier comprises a first carrier disposed on one side of the external gear in an axial direction and a second carrier disposed on the other side of the external gear in the axial direction,
wherein the first carrier and the second carrier are connected to each other via a carrier pin, and
wherein the carrier pin is formed of an iron-based metal.

17. The eccentrically oscillating type reduction gear according to claim 16, further comprising:
a spacer which is externally fitted to the carrier pin and is configured to keep a gap between the first carrier and the second carrier at a predetermined distance,
wherein the spacer is formed of a resin.

18. The eccentrically oscillating type reduction gear according to claim 16,
wherein the first carrier is formed of a light metal, and
wherein the second carrier is formed of a resin.

19. The eccentrically oscillating type reduction gear according to claim 1, further comprising:
a casing which integrally rotates with the internal gear;
a carrier which rotates relative to the casing; and
a main bearing which is disposed between the casing and the carrier,
wherein the internal gear main body and the external gear are formed of the resin containing a reinforcing fiber,
wherein the outer pin is formed of an iron-based metal,
wherein the main bearing is formed of an iron-based metal, and
wherein the carrier is formed of an aluminum-based metal.

20. The eccentrically oscillating type reduction gear according to claim 19, wherein the internal gear main body and the external gear are formed of the resin containing a carbon fiber as the reinforcing fiber.

* * * * *